US011072311B2

(12) United States Patent
Luchner et al.

(10) Patent No.: US 11,072,311 B2
(45) Date of Patent: Jul. 27, 2021

(54) METHODS AND SYSTEMS FOR USER RECOGNITION AND EXPRESSION FOR AN AUTOMOBILE

(71) Applicant: Future Mobility Corporation Limited, Hong Kong (HK)

(72) Inventors: Wolfram Luchner, Los Altos Hills, CA (US); Eric Veit, Cupertino, CA (US)

( * ) Notice: Subject to any disclaimer, the term of this patent is extended or adjusted under 35 U.S.C. 154(b) by 0 days.

(21) Appl. No.: 15/695,800

(22) Filed: Sep. 5, 2017

(65) Prior Publication Data

US 2019/0071055 A1   Mar. 7, 2019

(51) Int. Cl.
*G06K 9/00* (2006.01)
*B60R 25/25* (2013.01)
(Continued)

(52) U.S. Cl.
CPC ............ *B60R 25/25* (2013.01); *B60Q 1/0023* (2013.01); *B60W 50/08* (2013.01); *G06F 21/32* (2013.01);
(Continued)

(58) Field of Classification Search
CPC ..... B60R 25/305; B60R 25/25; B60Q 1/0023; B60W 50/08; B60W 2040/0809;
(Continued)

(56) References Cited

U.S. PATENT DOCUMENTS 6,373,148 B1    4/2002   Daiss et al.
6,498,970 B2 * 12/2002   Colmenarez ........ B60R 25/2045
                                                          382/116
(Continued)

FOREIGN PATENT DOCUMENTS

CN      105459958 A    4/2016
CN      107665295 A    2/2018
(Continued)

OTHER PUBLICATIONS

Transmittal of the International Search Report and Written Opinion of the International Searching Authority for PCT/US2018/048645, filed Aug. 29, 2018, dated Dec. 5, 2018, 888 pages.
(Continued)

*Primary Examiner* — Ian L Lemieux
(74) *Attorney, Agent, or Firm* — Womble Bond Dickinson (US) LLP

(57) ABSTRACT

Methods and systems are disclosed for user recognition and express for an automobile. For one example, a data processing system for an automobile includes a database, a user capture device, and a computer. The database stores at least an image of a user of the automobile. The user capture device captures at least an image of the user. The computer is coupled to the database and the user capture device. The computer allows the user access to the automobile if the user is authenticated as a valid user by determining if stored image of the user match the captured image of the user. The facial features can include two-dimensional (2D) or three-dimensional (3D) images including facial features. The computer allows the user access to the automobile and controls of the automobile if the user is authenticated as a valid user. The computer can also deny the user access to the automobile and controls of the automobile if the user is not authenticated as a valid user. The user can be a driver or a passenger of the automobile. The computer can also configure settings or preferences for the driver or passenger if authenticated as a valid user.

30 Claims, 12 Drawing Sheets

(51) Int. Cl.

| | |
|---|---|
| *G06F 21/32* | (2013.01) |
| *H04W 12/06* | (2021.01) |
| *G07C 9/00* | (2020.01) |
| *H04L 29/06* | (2006.01) |
| *H04L 9/32* | (2006.01) |
| *G07C 9/25* | (2020.01) |
| *G07C 9/37* | (2020.01) |
| *B60Q 1/00* | (2006.01) |
| *B60W 50/08* | (2020.01) |
| *H04L 29/08* | (2006.01) |
| *B60W 40/08* | (2012.01) |

(52) U.S. Cl.
CPC ..... *G06K 9/00228* (2013.01); *G06K 9/00268* (2013.01); *G07C 9/00563* (2013.01); *G07C 9/25* (2020.01); *G07C 9/37* (2020.01); *H04L 9/3231* (2013.01); *H04L 63/0861* (2013.01); *H04L 63/102* (2013.01); *H04L 67/306* (2013.01); *H04W 12/06* (2013.01); *B60W 2040/0809* (2013.01); *B60W 2420/42* (2013.01); *H04L 2209/84* (2013.01)

(58) Field of Classification Search
CPC ................ G06F 21/32; G06K 9/00228; G06K 9/00268; H04L 67/306; H04L 2209/84; G06Q 20/40; H04W 12/06
See application file for complete search history.

(56) References Cited

U.S. PATENT DOCUMENTS

| | | | |
|---|---|---|---|
| 7,263,437 B2* | 8/2007 | Hirose .................. G08G 1/202 | |
| | | | 340/902 |
| 8,918,162 B2* | 12/2014 | Prokoski .............. A61B 5/0064 | |
| | | | 600/475 |
| 8,994,498 B2* | 3/2015 | Agrafioti ................ G06F 21/40 | |
| | | | 340/5.82 |
| 9,083,581 B1* | 7/2015 | Addepalli ......... H04W 72/0406 | |
| 9,348,492 B1* | 5/2016 | Penilla .................. B60W 40/08 | |
| 9,613,515 B2 | 4/2017 | Frakah-Asante et al. | |
| 9,760,702 B1 | 9/2017 | Kursun et al. | |
| 9,963,106 B1 | 5/2018 | Ricci | |
| 10,391,976 B2* | 8/2019 | Outwater ................ B60R 25/04 | |
| 10,414,377 B2* | 9/2019 | Hoyos ................ G07C 9/00563 | |
| 10,676,067 B2 | 6/2020 | Slovesko | |
| 10,745,018 B2 | 8/2020 | Abendroth et al. | |
| 2002/0112177 A1 | 8/2002 | Voltmer et al. | |
| 2004/0174253 A1 | 9/2004 | Chen | |
| 2004/0236501 A1 | 11/2004 | Hirose et al. | |
| 2004/0263323 A1 | 12/2004 | Seike et al. | |
| 2006/0046684 A1 | 3/2006 | Kameyama | |
| 2006/0082437 A1 | 4/2006 | Yuhara | |
| 2007/0124599 A1 | 5/2007 | Morita et al. | |
| 2007/0239992 A1* | 10/2007 | White .................. B60K 28/063 | |
| | | | 713/186 |
| 2008/0106390 A1* | 5/2008 | White .................... B60R 25/04 | |
| | | | 340/426.11 |
| 2009/0046538 A1 | 2/2009 | Breed et al. | |
| 2010/0148923 A1 | 6/2010 | Takizawa | |
| 2010/0152976 A1* | 6/2010 | White .................... A61B 5/145 | |
| | | | 701/48 |
| 2012/0253607 A1* | 10/2012 | Choi ..................... B60R 25/25 | |
| | | | 701/49 |
| 2014/0223531 A1* | 8/2014 | Outwater ............ H04L 63/0861 | |
| | | | 726/7 |
| 2014/0358376 A1* | 12/2014 | Phelan .................. B60W 10/04 | |
| | | | 701/41 |
| 2015/0116086 A1 | 4/2015 | Kim et al. | |
| 2015/0191152 A1 | 7/2015 | Gennermann | |
| 2015/0363986 A1* | 12/2015 | Hoyos .................. H05K 999/99 | |
| | | | 340/5.61 |
| 2016/0063315 A1* | 3/2016 | Lim .................... G06K 9/00221 | |
| | | | 701/36 |
| 2016/0070898 A1 | 3/2016 | Kwok-Suzuki et al. | |
| 2016/0171321 A1* | 6/2016 | Ohsuga .............. G06K 9/00845 | |
| | | | 345/419 |
| 2016/0174253 A1 | 6/2016 | Liu et al. | |
| 2016/0300410 A1 | 10/2016 | Jones et al. | |
| 2016/0311400 A1 | 10/2016 | Gennermann | |
| 2017/0008490 A1* | 1/2017 | Sako ........................ B60R 25/25 | |
| 2017/0060234 A1* | 3/2017 | Sung ........................ B60R 1/006 | |
| 2017/0127283 A1 | 5/2017 | Tanabe et al. | |
| 2017/0274825 A1 | 9/2017 | Woodhouse et al. | |
| 2018/0012427 A1 | 1/2018 | Ricci | |
| 2018/0044964 A1 | 2/2018 | Ikeda et al. | |
| 2018/0201225 A1* | 7/2018 | Farges ..................... G06F 21/32 | |
| 2018/0204399 A1* | 7/2018 | Newman ............... H04W 12/08 | |
| 2018/0361931 A1 | 12/2018 | Ajisaka | |
| 2018/0365400 A1* | 12/2018 | Lopez-Hinojosa ..... G06F 21/32 | |
| 2019/0032374 A1 | 1/2019 | Linden et al. | |
| 2019/0061640 A1 | 2/2019 | Jefferson et al. | |
| 2019/0073111 A1* | 3/2019 | Luchner ................ G06F 3/0304 | |
| 2019/0202475 A1* | 7/2019 | Phelan .................. B60R 16/033 | |
| 2019/0210563 A1* | 7/2019 | Slovesko .............. B60R 25/305 | |
| 2019/0366980 A1* | 12/2019 | Anastasia ............... B60R 25/31 | |
| 2020/0086881 A1* | 3/2020 | Abendroth ......... G06K 9/00288 | |

FOREIGN PATENT DOCUMENTS

| | | |
|---|---|---|
| DE | 10026596 C1 | 12/2001 |
| DE | 102013002687 A1 | 8/2014 |
| WO | 2017066286 A1 | 4/2017 |

OTHER PUBLICATIONS

The International Search Report and Written Opinion of the International Searching Authority for PCT Application No. PCT/CN2019/106255 dated Dec. 12, 2019, 8 pages.
The International Preliminary Report on Patentability or PCT Application No. PCT/US2018/048645 dated Mar. 10, 2020, 7 pages.
The International Search Report and Written Opinion of the International Searching Authority for PCT Application No. PCT/US2018/058594 dated May 2, 2019, 12 pages.
The International Preliminary Report on Patentability for PCT Application No. PCT/US2019/058594 dated Jul. 7, 2020, 8 pages.
The Notice of Allowance for U.S. Appl. No. 16/136,052 dated Mar. 27, 2020, 10 pages.
The Notice of Allowance for U.S. Appl. No. 16/136,052 dated Dec. 18, 2019, 10 pages.
The Non-Final Office Action for U.S. Appl. No. 16/136,052 dated May 15, 2019, 7 pages.
The Notice of Allowance for U.S. Appl. No. 15/863,831 dated Feb. 3, 2020, 5 pages.
The Non-Final Office Action for U.S. Appl. No. 15/863,831 dated Jun. 17, 2019, 5 pages.

* cited by examiner

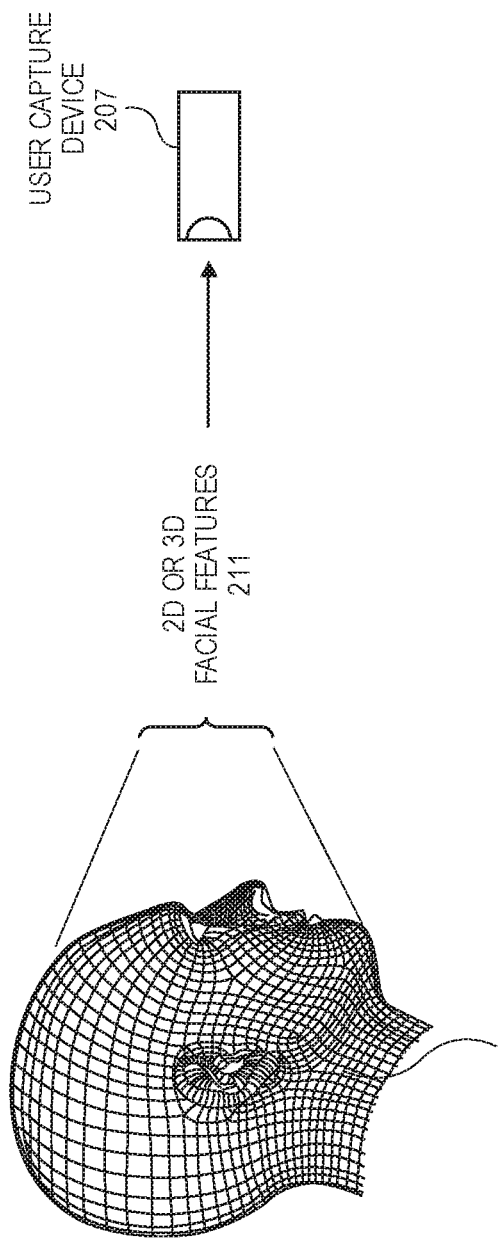
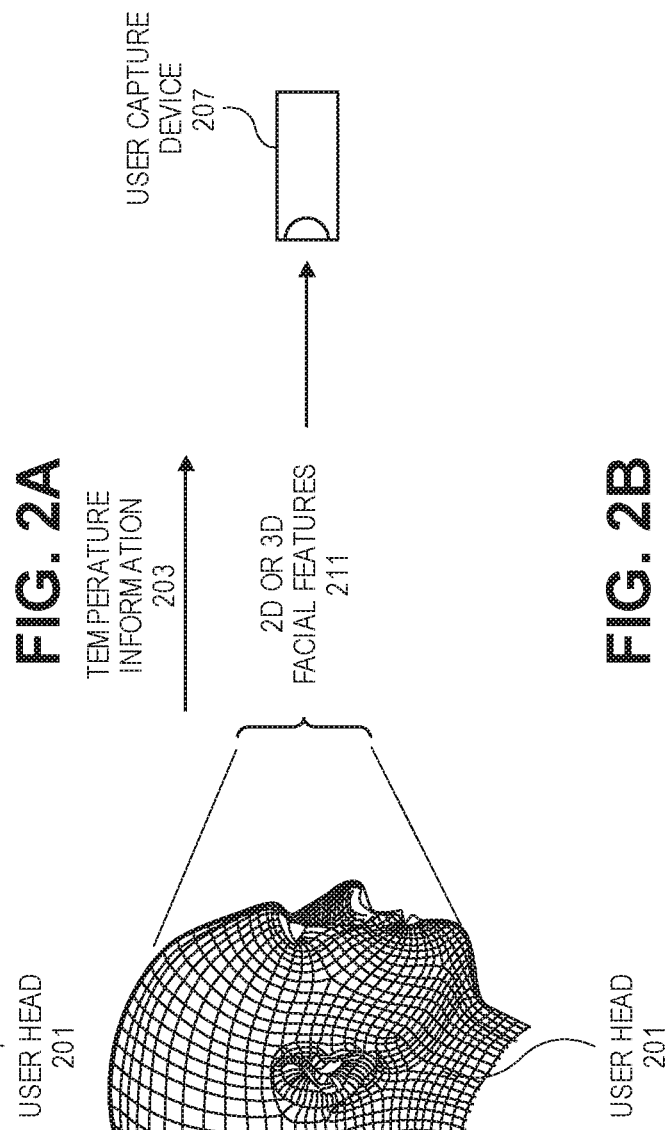

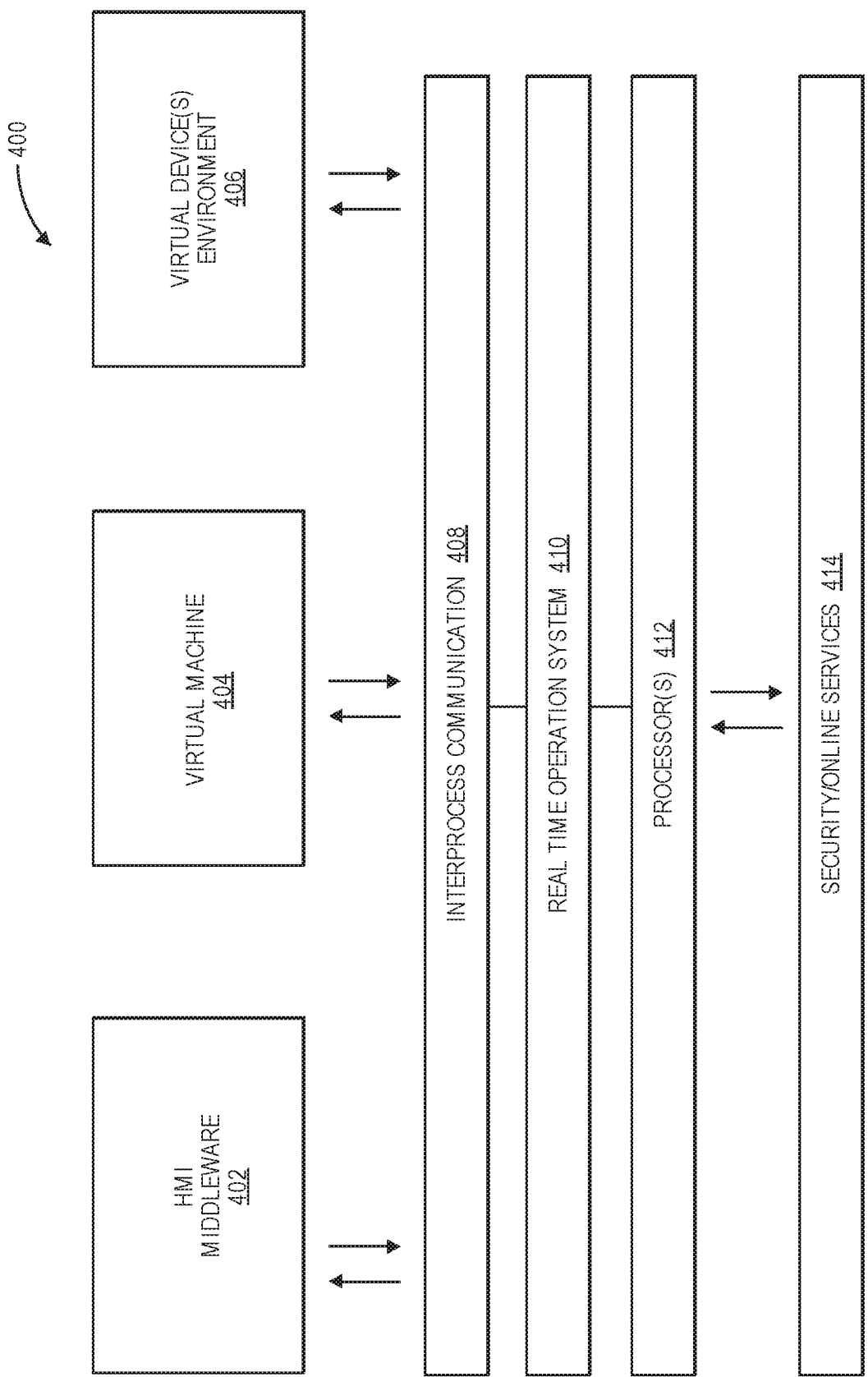

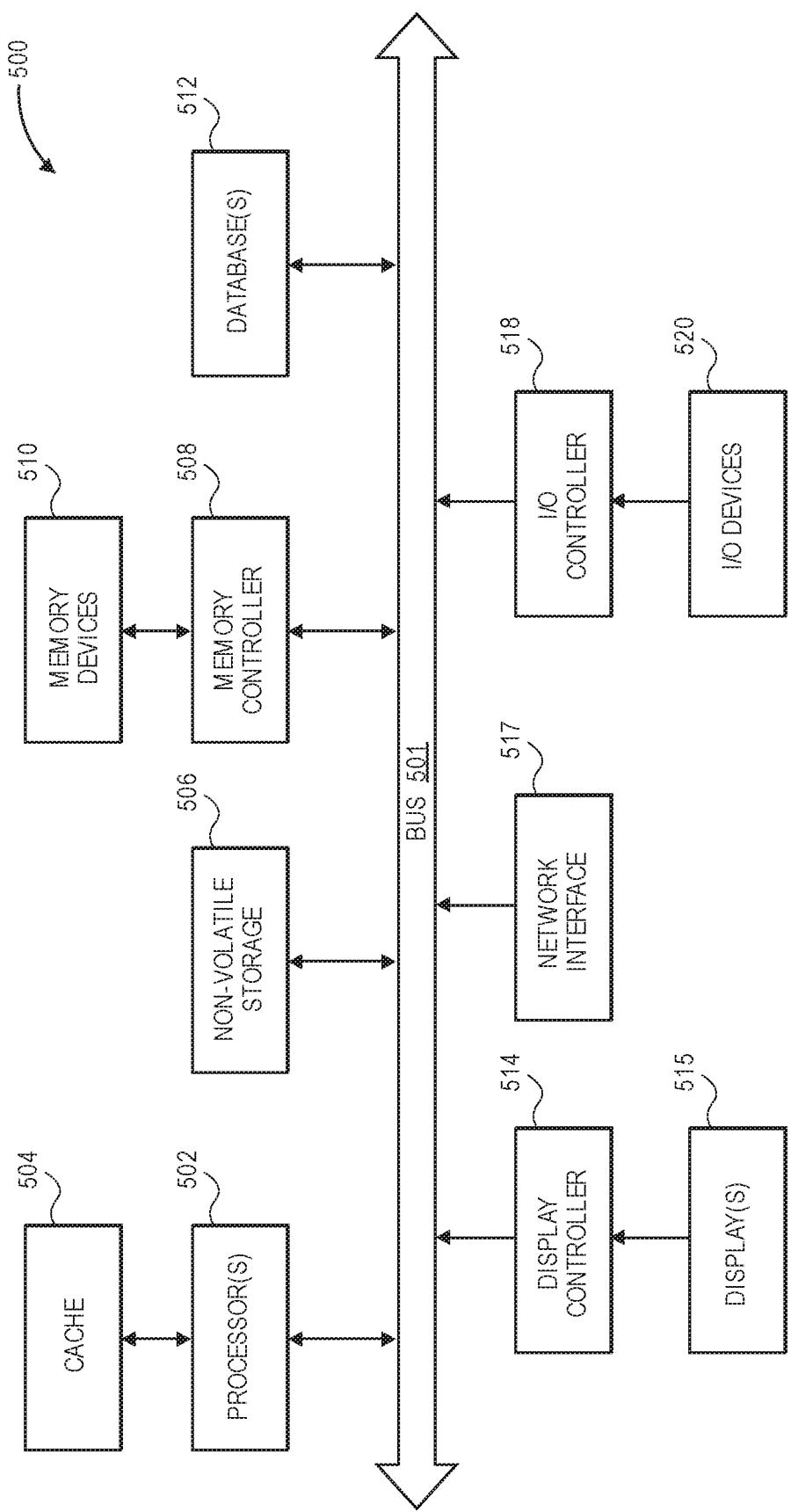

METHODS AND SYSTEMS FOR USER RECOGNITION AND EXPRESSION FOR AN AUTOMOBILE

FIELD

Embodiments of the invention are in the field of data and image processing and user identification, recognition and authentication. More particularly, embodiments of the invention relate to methods and systems for user recognition and expression for an automobile.

BACKGROUND

Automobiles have become more sophisticated with advanced electronic controls and integrated computers enhancing the driving experience. Such controls and computers can provide an array of user applications with access to vast amounts of information including private information. Security and access to these electronic controls and computers are limited to keys, door lock systems and login/passwords to the computers. If the keys, door locks and login/passwords are compromised, an unauthorized user or driver can gain access and entry to the automobile including access to electronic controls and computers connected to private information. Valid driver or user identification is needed in automobiles to allow only authorized access to the automobile and its electronic controls and computers.

SUMMARY

Methods and systems are disclosed for user recognition and expression for an automobile. For one example, a data processing system for an automobile includes a database, a user capture device, and a computer. The database stores at least an image of a user of the automobile. The user capture device captures at least an image of the user. The computer is coupled to the database and the user capture device. The computer allows the user access to the automobile if the user is authenticated as a valid user by determining if stored image of the user match the captured image of the user. For one example, the user image includes two-dimensional (2D) or three-dimensional (3D) user images including facial features.

For one example, the computer allows the user access to the automobile and controls of the automobile if the user is authenticated as a valid user. The computer can also deny the user access to the automobile and controls of the automobile if the user is not authenticated as a valid user. For one example, the user is a driver or passenger of the automobile. The computer can also configure settings or preferences for the driver or passenger if authenticated and recognized as a valid user.

For one example, the user capture device can be located inside or outside of the automobile. For one example, the user capture device captures an expression of the user including, e.g., a selfie, smile, frown, sleeping, dozing, eyes opening and shutting, anger, happiness, fatigue, anger, stress, or shaking. For one example, the computer can provide a response based on the captured expression (e.g., audio alerting the driver you are falling asleep if eyes are shut for more than a prescribed time period). For one example, the user capture device includes one or more cameras including a stereo camera, a RGB (red, green, blue) camera, or an infrared camera. The user capture device can capture temperature differential information using the infrared camera to further authenticate and recognize a valid user.

Other methods, systems, and computer-readable mediums for user recognition and expression for an automobile are described.

BRIEF DESCRIPTION OF THE DRAWINGS

The appended drawings illustrate examples and are, therefore, exemplary embodiments and not considered to be limiting in scope.

FIGS. 2A-2B illustrate examples of capturing user images and features by a user capture device.

FIG. 4 illustrates one example block diagram of data processing or computing system architecture which can be used for the automobile of FIGS. 1A-3B.

FIG. 5 illustrates one example block diagram of a computing system for the data processing system architecture of FIG. 4.

DETAILED DESCRIPTION

Embodiments and examples are disclosed for user recognition and expression for an automobile. For one example, a data processing system for an automobile includes a database, a user capture device, and a computer. The database stores at least an image of a user of the automobile. The user capture device captures at least an image of the user. The computer is coupled to the database and the user capture device. The computer can allow the user access to the automobile if the user is authenticated as a valid user by determining if stored image of the user match the captured image of the user. For one example, the facial features include two-dimensional (2D) or three-dimensional (3D) images including facial features.

For one example, the computer allows the user access to the automobile and controls of the automobile if the user is authenticated as a valid user. The computer can also deny the user access to the automobile and controls of the automobile if the user is not authenticated as a valid user. For one example, the user is a driver or passenger of the automobile. The computer can also configure settings or preferences for the driver or passenger of the automobile if authenticated as a valid user.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described in order to provide a concise discussion of the embodiments and examples.

Although the following examples and embodiments are directed to user recognition and expression detection techniques for an automobile, such techniques can be applied to any type of environment needing entry and access. The disclosed techniques can avoid requiring keys for entry and access and prevent impersonation and unauthorized use of electronic controls and computers from invalid users.

Exemplary Automobile Having User Recognition and Expression Detection

Figure 1A:
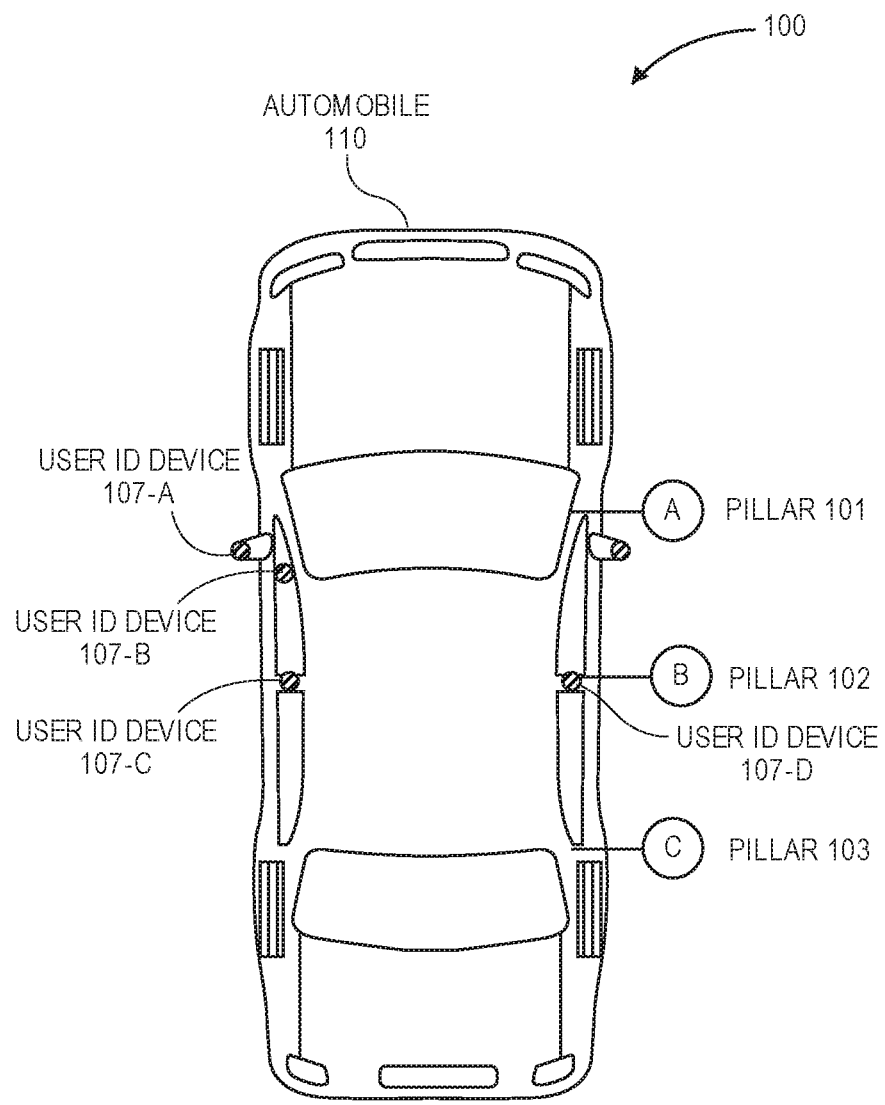
FIG. 1A illustrates one example of a top view of an automobile having user identification (ID) devices.
Figure 1B:
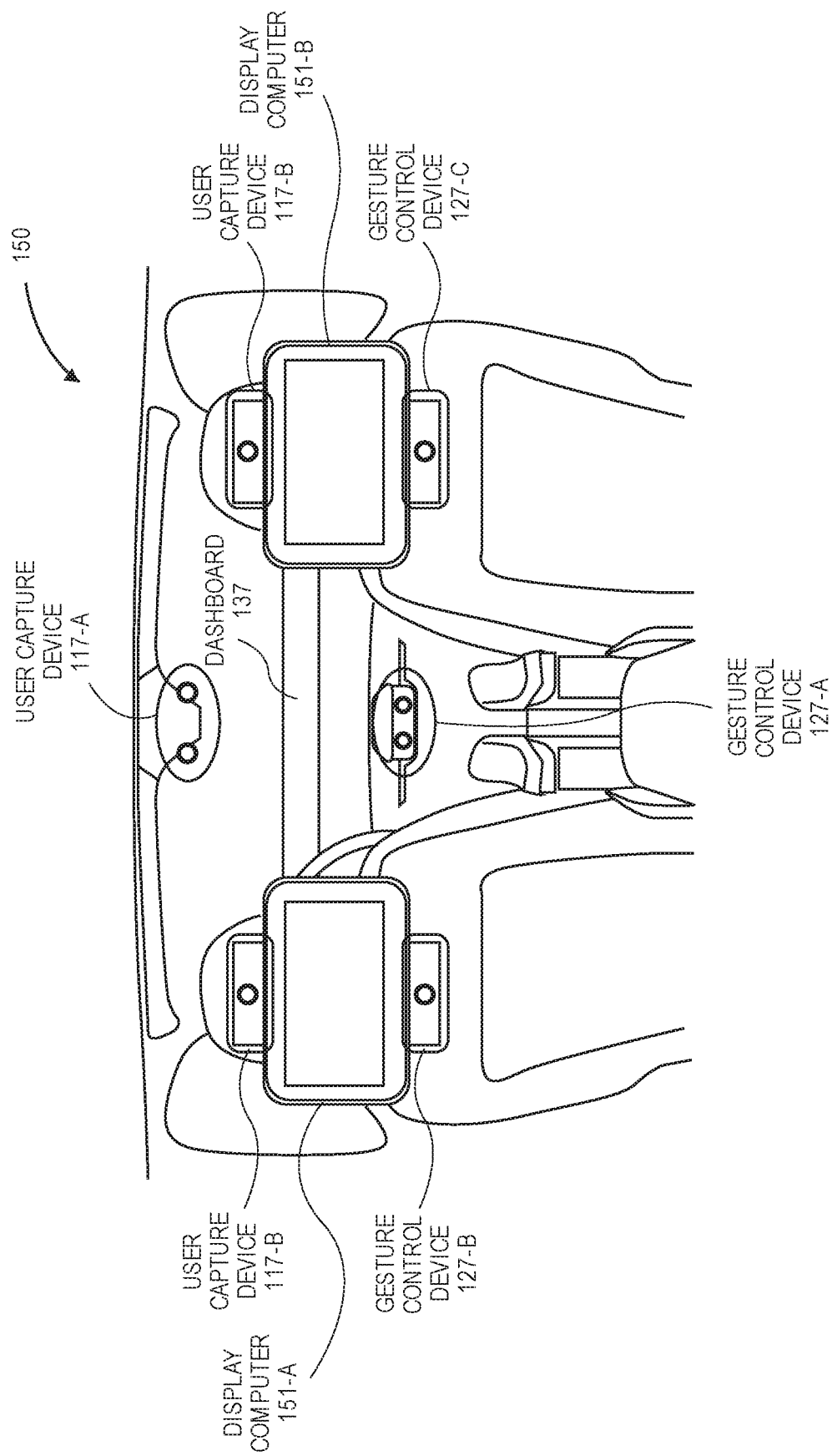
FIG. 1B illustrates one example of an inside view of an automobile having user capture and gesture control devices.

FIGS. 1A-1B illustrate examples of top and inside views (100 and 150) of automobile 110 having user identification (ID) and gesture control devices. For one example, one or more users (e.g., drivers or passengers) can have bio-scan information registered to access and use automobile. For one example, the bio-scan information can be stored in a secured database or in secured cloud storage. Examples of bio-scan information can include two-dimensional (2D) or three-dimensional images of a user including 2D or 3D facial images of the user.

Registering of bio-scan information for a user can be initiated by an application used to purchase or order automobile 110. For example, when automobile 110 is purchased and delivered, an application running on a mobile device that has been authenticated for the automobile 110, e.g., a mobile phone, tablet computer, laptop computer, etc. with personal identification and password authentication, fingerprint authentication, or two stage authentication, can capture images of the user using one or more cameras on the device and store and register the images in a secured environment for automobile 110 as a valid user. A registered valid user can be registered as authorized to drive automobile 110 or restricted from driving automobile 110. For example, both a husband and wife may be registered to drive automobile 110, but all the children do not have authorization to drive automobile 110. For one example, automobile 110 can include one or more cameras to capture an image of the user and store and register the images for automobile 110 as a valid user.

Referring to FIG. 1A, the top view 100 shows automobile 110 having pillars A, B and C (101, 102, 103) formed on both the right and left sides of automobile 110. For one example, a plurality of user ID devices (107-A through 107-D) can be mounted on and at different locations of the automobile which can be used to identify, recognize and authenticate users (e.g., drivers or passengers) of automobile 110 to allow entry and access to automobile 110 including access to controls and computers within automobile 220. User ID devices 107-A through 107-D can also be used to capture images of one or more users that are registered for automobile 110 as valid users. For example, a user can approach user ID device 107-B and initiate a bio-scan registration on an application running on a mobile device that has been authenticated with automobile 110 in which user ID device 107-B captures images of the user to store and register for automobile 110 as a valid user.

Each user ID device 107-A through 107-D can include one or more cameras such as, e.g., a stereo camera, RGB (red, green, blue) camera, or infrared cameras, to capture user bio-scan information including 2D or 3D facial images and features and thermal differential information. The cameras can be any type of commercially available camera including respective hardware and software configured to use and implement techniques and operations described in FIGS. 1A-8. For one example, the captured user images can be compared with stored or registered user images, e.g., stored in a database, to determine if the captured image matches a stored image and to authenticate the user as a valid user if a match exists. If authenticated as a valid user, automobile 110 can allow access and entry to the user. In this way, keys for automobile 110 are not necessary by having user ID devices 107-A through 107-D to capture images of a user which are used to detect and recognize valid users, e.g., drivers or passengers of automobile 110.

From the top view 100 of FIG. 1A, user ID devices 107-C and 107-D can be located on pillar B (102) in between doors on both sides of automobile 110 to identify and recognize users approaching the right or left side of automobile 110. For one example, user ID device 107-B mounted and located on a door support of the driver side can detect an approaching driver to determine if the person is a valid and authorized person to access and enter the automobile. For example, if the user identified and recognized by user ID devices 107-B, 107-C or 107-D as a valid user, automobile 110 can automatically unlock the doors for the user instead of having the user insert or activate keys for automobile 110. For one example, user ID device 107-A connected to pillar A (101) can detect a user (driver) approaching the automobile from the rear end. Each of the user ID devices 107-A through 107-D can be coupled and communicate with automobile 110 computer systems including locking systems and mechanisms of the automobile 110 and if a valid user is detected by, e.g., matching captured user images with stored user images in a database, the locking systems and mechanisms for automobile 110 can automatically unlock the respective door for such a valid user and allow access to automobile 110. For one example, only valid users identified a valid driver can have access to driving controls to drive automobile 110.

Referring to FIG. 1B, the inside view 150 of automobile 110 is shown from a backseat view perspective towards dashboard 137. For one example, automobile 110 includes a plurality of user capture devices 117-A through 117-C and gesture control devices 127-A through 127-C. For one example, user capture device 117-A is located above dashboard 137 at the top of the front windshield, and user capture devices 117-B and 117-C are located on the backside of the driver and passenger seat head rests. Each user capture devices 117-A through 117-C can include one or more stereo, RGB (red, green, blue), or infrared cameras to capture user images (e.g., user facial images, expressions, and features) or thermal differential information (e.g., temperature differential information of a user head and surrounding area).

For one example, user capture device 117-A can capture a user image of a driver or passenger to identify and recognize the user as a valid user. For one example, if the user is determined to be a valid user, computing system and controls for automobile 110 can configure settings and preferences for the user as a driver or passenger. For example, the driver may wish climate control to be cool and settings and preferences can be set based on the recognized driver. A passenger may also prefer certain music and music controls which can be set for the recognized passenger on a display in automobile 110. For one example, only valid users that are identified as a valid driver can have access to driving controls of automobile 110 and be able to drive automobile 110.

For one example, user capture device 117-A can capture one or more images or expressions of a user (e.g., expressions of the driver or passenger) such as, e.g., a selfie, smile, frown, sleeping, dozing, eyes opening and shutting, anger, happiness, fatigue, anger, stress, or shaking. For one example, computing systems and control for automobile 110 can react to a captured user expression, e.g., if falling sleep providing an audio alert or if recognizing annoyed expression if music is too loud lowering the volume of the radio. Computing systems and control can be programmed to react in any desired manner and differently for each valid user of automobile 110.

For one example, user capture devices 117-B and 117-C operate in the same way as user capture device 117-A for passengers behind the driver set and front passenger seat and settings and preferences for display computers 151-A and 151-B can also be set accordingly to settings and preferences for a recognized user in the back seats. For one example, user capture devices 117-A through 117-C can include an infrared camera and detect temperature differential information of users in determining wellness, e.g., if a user is sick with a fever.

For one example, automobile 110 includes gesture control devices 127-A through 127-C located below a dashboard of automobile 110 and display computers 151-A and 151-B. Each of these gesture control devices 127-A through 127-C can include one or more cameras (e.g., time of flight TOF cameras) or motion sensors to detect hand gestures and movement of a user (e.g., a driver or passengers of automobile 110) in controlling or accessing functions, applications, information, options, icons, or objects provided on a display of the dashboard of automobile 110 or display computers 151-A and 151-B. For one example, gesture control devices 127-A through 127-C can include hardware and software from Intel Realsense® to implement gesture control of interfaces on a display of dashboard 137 or display computers 151-A and 151-B.

Exemplary User Features and Expressions

FIGS. 2A-2B illustrate examples of capturing user images and features by a user capture device 207. Referring to FIG. 2A, a user head 201 is depicted three-dimensionally. For one example, user capture device 207 can capture two-dimensional (2D) or three-dimensional (3D) images including facial features 211 of user head 201. User head 201 is depicted to illustrate a head of a user, which can be a driver or a passenger for automobile 110, and identified or recognized by user capture device 207. User capture device 207 can include on or more cameras in the same way as user ID devices 107-A through 107-D shown in FIG. 1A or user capture devices 117-A through 117-C shown in FIG. 1B.

For one example, user capture device 207 can include any type of RGB camera to capture 2D user features (e.g., 2D facial features 211) or a stereo camera to capture 3D user features (e.g., 3D facial features 211) of user head 201. Examples of facial features in user images can include shape, size, and dimensions of, e.g., the nose, mouth, ears, eyes, eyebrows, lips, cheeks, birth marks, face width, head size, hair color, etc. of user head 201. For one example, 2D or 3D user images and facial feature information can be stored during registration of bio-scan information for a user of automobile 110 which can be stored in a secured database within automobile 110 or remotely in a secured cloud environment. For one example, user capture device 207 can be used to identify and recognize facial features of user head 201 to determine if such features match those stored in the database for the user in authenticating the user as a valid user for automobile 110. Any type of facial feature recognition algorithms can be used such as, e.g., open source facial recognition algorithms provided by OpenCV software. For one example, user capture device 207 can capture a facial image of a child that can be a valid passenger of automobile 110, but an automobile 110 computer can deny and prevent the child from driver controls and driving automobile 110.

For one example, user capture device 207 can be used to capture user images to detect expressions of the user. For example, capture device 207 can capture a selfie, smile, frown, sleeping, dozing, eyes opening and shutting, anger, happiness, sadness, fatigue, anger, stress, or shaking by the user. For one example, the captured expression can be processed and analyzed by computing systems within automobile 110 in providing a reaction or no reaction is necessary. For example, if capture device 207 captures the user's eyes shutting for a predetermined period of time indicating a driver is falling asleep, a computer for automobile 110 can react by providing an audio response such as "Tim please wake up you are falling asleep". Other reactions can include messages on a display, blinking lights on a display, changing settings and preferences, and etc.

Referring to FIG. 2B, for one example, user capture device 207 can include an infrared camera that can capture temperature information 203. Such information can include temperature differential information. For example, a person would have a different temperature differential infrared image than an inanimate object. This type of temperature information 203 can be further used to determine if user head 201 matches a valid user and can detect impersonation. User capture device 207 can be located inside and outside of automobile 110 and an aligned to capture user images of user head 201. Temperature information can also be compared between users of automobile 110 to determine wellness of a user in a driver seat or passenger seat.

Exemplary Driver Control Environments with User Capture Devices

Figure 3A:
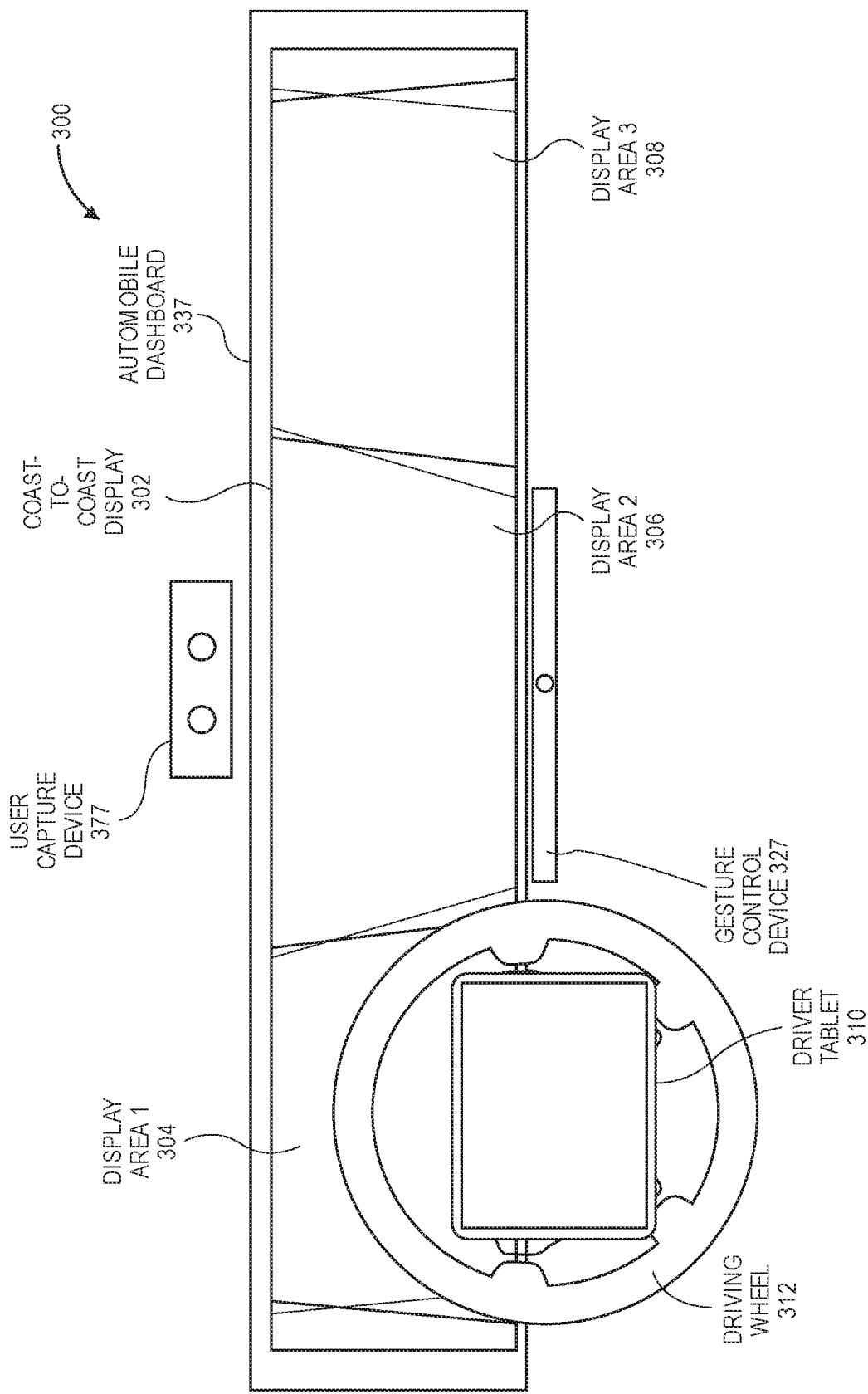
FIGS. 3A-3B illustrate exemplary driver control environments for an automobile with a user capture device.
Figure 3B:
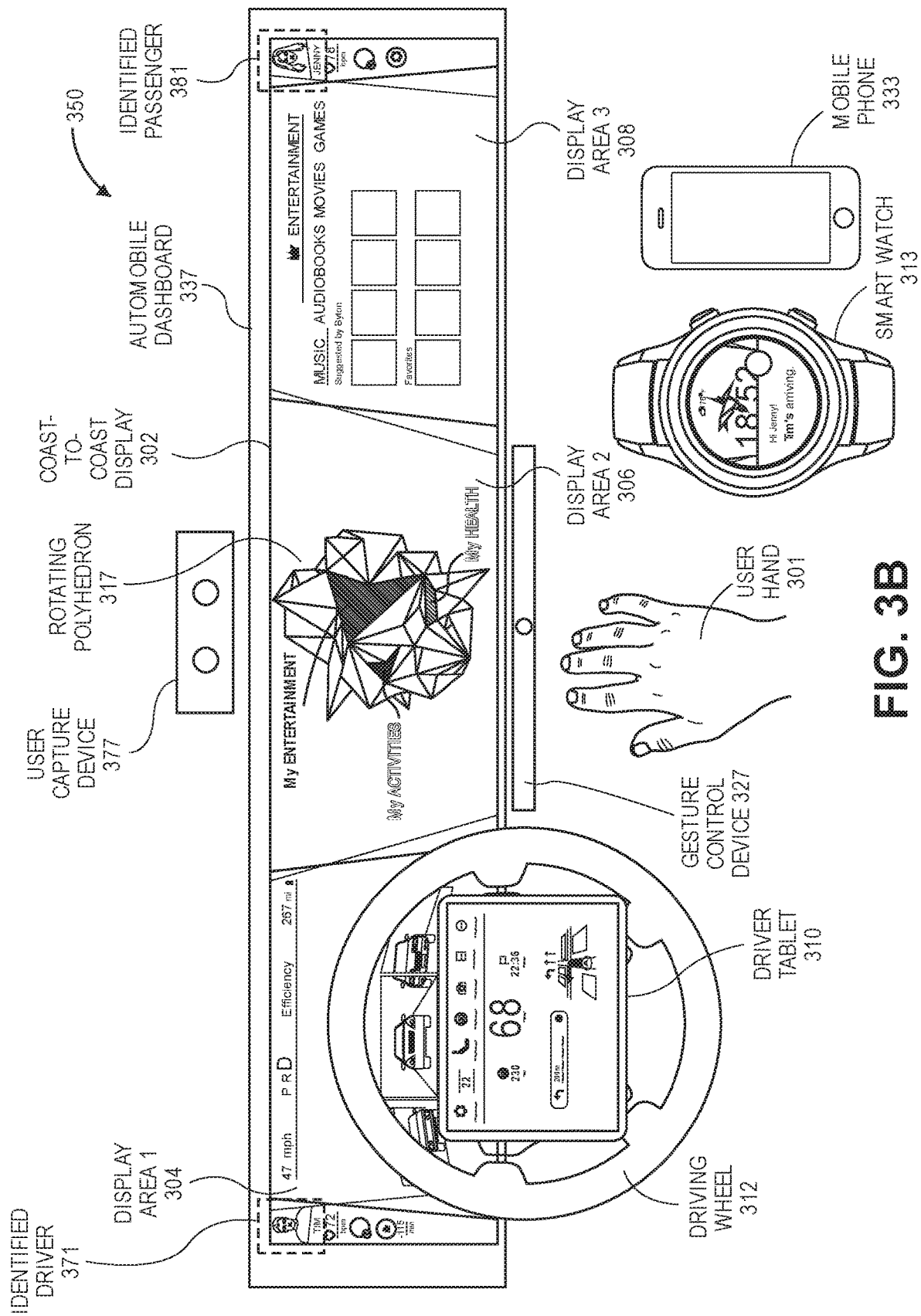

FIGS. 3A-3B illustrate exemplary driver control environments 300 and 350 for an automobile (e.g., automobile 110) with a user capture device 307.

Referring to FIG. 3A, a driver control environment 300 is shown from a front seat view perspective. For one example, driver control environment 300 includes automobile dashboard 337 with a driving wheel 312 and coast-to-coast display 302. Coast-to-coast display 302 includes three display areas: display area 1 (304), 2 (306) and 3 (308). Although not shown, within automobile dashboard 337 can include one more computing devices (computers) to provide automobile controls and applications. For one example, user capture device 307 can be mounted and located above dashboard 337 and includes one or more cameras to capture images or expressions of users (e.g., the driver or passenger in the front seats). Gesture control device 327 can be mounted below coast-to-coast display 302 on automobile dashboard 332. Gesture control device 327 can include or more motion cameras (e.g., time of flight TOF cameras) and sensors to capture, e.g., hand gestures of a user, to access and control applications and interfaces on display areas 1-3 (304, 306, and 308) of coast-to-coast display 302.

For one example, user capture device 307 can be mounted above automobile dashboard 332 e.g., on a windshield of the automobile and can include one or more cameras and operate in the same way as user capture devices described in FIGS. 1A-2B to capture user images, features and expressions. The location of user capture device 307 can be located or mounted so as to be aligned to capture user images and expressions of a driver or front seat passenger as shown in FIGS. 2A-2B. Other locations for user capture device 307 can be on dashboard 337, a pillar left of driving wheel 312 (inside or outside of the automobile), a pillar right of passenger seat (inside or outside of the automobile). Although not shown, other cameras can be mounted within or outside of the automobile to take side view and rearview images which can be shown on coast-to-coast display 302, e.g., on left side in display area 1 (304) to avoid having to use side view mirrors and a rearview mirror.

Referring to FIG. 3B, a driver control environment 350 is shown from front view perspective with user interfaces and applications provided on coast-to-coast display 302 on automobile dashboard 337. Driving wheel 312 and driver tablet 310 are mounted on dashboard 337. Driver tablet 310 can provide a driver interface to access controls including settings and preferences for the automobile (e.g., automobile 110). For one example, user capture device 377 can be located and positioned above dashboard 337 having one or more cameras to detect and identify a driver (e.g., identified driver 371 "Tim" or identified passenger 381 "Jenny"). For one example, once Tim is authenticated as a valid user or driver using user capture device 377 (e.g., matching user images of Tim with stored user images to detect Tim as a valid user). User capture device 377 can also capture expressions of a driver or passenger, e.g., Tim or Jenny, and provide a reaction, e.g., an audio alert if a driver is falling asleep. For other examples, if a child is sitting in the driver seat, user capture device 337 can capture an image of the child and driver tablet 310 or an automobile computer can detect the child and deny controls to driver table 310 or coast-to-coast display 302 and prevent the child from driving the automobile or accessing any of its controls.

For one example, once authenticated as a valid driver, e.g., Tim, driver tablet 310 or an automobile computer (e.g., within automobile dashboard 337) can configure settings and preferences for Tim including settings and preferences for control interfaces on coast-to-coast display 302. For example, as shown in display area 3 (308), entertainment settings may be set for Tim with preferences for Music, Audiobooks, Movies, Games as shown in display area 3 (308) and a corresponding rotating polyhedron 317 for Tim. A passenger, e.g., Jenny, can also have settings and preferences set designated for Jenny on coast-to-coast display 302 once authenticated. Examples of settings and preferences can include personalized user interfaces on coast-to-coast display 302, personalized seat controls, personalized steering wheel controls, pedal locations, personalized climate control, personalized phone interface, personalized mapping etc.

For one example, gesture control device 327 is located and positioned below automobile dashboard 337 having one or more cameras and motion sensors to detect hand gestures and movement of user hand 307. For example, user hand 307 can represent a hand of a driver or a passenger (e.g., who have been properly recognized as a valid user) and gesture control device 327 can capture user gestures (e.g., gestures of user hand 307) in controlling or accessing functions, applications, information, options, icons, or objects provided on coast-to-coast display 302. For one example, gesture control device 327 can include hardware and software from Intel Realsense® and user capture device 377 can include one or more cameras, e.g., a time of flight TOF camera.

For one example, driver tablet 310 is a tablet computer and can provide a touch screen with haptic feedback and controls. Driver tablet 310 can provide primary vehicle function controls for a driver or user such as climate control and various settings for environment 100 which can be set once a valid user is identified and authenticated, e.g., identified driver 371 Tim or identified passenger 381 Jenny. Driver tablet 310 can be coupled to an automobile computer (not shown) within automobile dashboard 337, user capture device 377 or gesture control device 327. Driver tablet 310, automobile computer, or both can be configured to recognize a driver (e.g., Tim) or a passenger (e.g., Jenny) and allow the driver or passenger to use gesture control device 327 and access coast-to-coast display 302. For one example, driver tablet 310 can provide any number of representations, objects, icons, or buttons on its touchscreen providing functions, navigation user interface, phone control user interface to answer phone calls via a Bluetooth connection with mobile phone 333 or receive data and information from a wearable device such as smart watch 313, e.g., activity information such as heartbeats or number of steps climbed.

Coast-to-coast display 302 can include a light emitting diode (LED) display, liquid crystal display (LCD), organic light emitting diode (OLED), or quantum dot display, which can run from one side to the other side of automobile dashboard 337. For one example, coast-to-display 302 can be a curved display integrated into and spans the width of automobile dashboard 337. One or more graphical user interfaces can be provided in a plurality of display areas such as display areas 1 (304), 2 (306), and 3 (308) of coast-to-coast display 302. Such graphical user interfaces can include status menus shown in, e.g., display areas 1 (304) and 3 (308).

For one example, display area 1 (304) can show rearview or side view images of the vehicle or automobile from one or more cameras which can be located outside or inside of the automobile in order to capture rear view of side view images. For one example, display area 2 (306) can provide and display a rotatable three-dimensional object such as rotating polyhedron 317 having polygonal faces defined by dots and lines. Alternatively, display area 3 (308) can display rotating polyhedron 327. Rotating polyhedron 317 can appear in display area 2 (306) as floating in space and can rotate at a constant or variable speed.

For one example, rotating polyhedron 317 can provide a group of information using one or more faces, dots, and lines which can provide a tangible form of various parameters and types of user information for each user (driver or passenger) which has been authenticated as valid user. That is, each authenticated or valid user of the automobile can have a personalized rotating polyhedron 317 for accessing and controlling user information and applications shown display area 2 (306) and display area 3 (308). For example, any number of drivers or users can be registered with stored bio-scan information such as, e.g., facial features or expressions, in a database. User capture device 377 can be used to identify, recognize, and authenticate as a user as valid and driver tablet 310 can provide a personalized polyhedron 317 for each valid user.

Examples of types or groups of information or applications which can be associated and personalized for each valid user (e.g., a valid driver or passenger) can include user information and application such as "MyEntertainment", "MyActivities", and "MyHealth" with a corresponding face on rotating polyhedron 317 as shown in display area 2 (306). The dots or lines and number of dots and lines defining polygonal faces on rotating polyhedron 317 can also represent various parameters related to user information such as "MyEntertainment", "MyActivities", and "MyHealth." For example, the number of dots defining the polygonal face for MyHealth can indicate the number of categories of health information for a valid user.

For one example, a driver or user hand 307 can rotate polyhedron 327 along any axis using hand gestures captured by gesture control device 327 to select a user information or application by moving a desired face of the polyhedron 327 to the foreground, e.g., the foreground of display area 2 (306). Referring to FIG. 3B, the face for MyEntertainment is in the foreground indicating that it is a selected user information or application. For one example, when a selected user information or application is positioned in the foreground, e.g., MyEntertainment, by user hand 301 the user information or application icons, categories, items, controls, etc. are shown in display area 3 (308). For other examples, a control object or cursor or avatar can be shown in coast-to-coast display 302 to select faces on polyhedron 327. Examples of user gestures to rotate the polyhedron include moving the hand or fingers from left to right or vice versa to rotate the polyhedron 317 accordingly. Other movements can be recognized to rotate polyhedron 317 along different axis to move a desired face of polyhedron 317 to the foreground to select the desired user information or application, e.g., MyEntertainment. Once a desired face of polyhedron 317 is in the foreground, a user can provide a grab and release motion with user hand 307 to obtain additional information regarding the selected user information or application.

Referring to FIG. 3B, for example, the polygonal face for MyEntertainment includes four dots or sides which can correspond to four parameters or categories for the user when accessing MyEntertainment, e.g., "Music," "Audiobooks," "Movies," and "Games" are shown in display area 3 (308). A driver or user can motion with user hand 307 to rotate polyhedron 317 such that the MyEntertainment face is in the foreground to select MyEntertainment and displays specific items for MyEntertainment in display area 3 (308). A driver or user can then motion with user hand 307 to display area 3 (308) captured by gesture control device 327 to access, e.g., a particular music item in display area 3 (308) under Music category to play. Similarly, "MyActivities" and "MyHealth" includes four points and lines which can represent four different parameters or categories of user information, e.g., phone calls, heart beats, number of steps climbed, etc. For other examples, a dot can represent the weight of a user, the heart rate of a user, etc. The number of dots and lines can alter and modify the shape of rotating polyhedron 317. For example, if more dots are health related, the polygonal face for "MyHealth" can have polygonal surface with a larger number of dots and lines with a larger face.

Referring to "MyEntertainment" example, when a user watches a movie a data point can be generated in the "MyEntertainment" face of rotating polyhedron 317. Referring to "MyActivities" example, a data point can be generated for a missed cell phone call. Data points can also be generated indicating unread text messages. For "MyHealth" example, some dots on rotating polyhedron 317 can be preconfigured such as indicating user weight. In other examples, a driver or user by way of driver tablet 310 can add dots, e.g., dots indicating blood pressure or dots keeping track of steps for health purposes. The added dots can alter the polygonal face for "MyHealth" on rotating polyhedron 117. Each driver or user can have a user account which can generate a minimum number of baseline dots in rendering rotating polyhedron 317 on coast-to-coast display 302. The driver or user can also add dots on specific types of information to tack, e.g., missed calls.

Categories, associated information and parameters can be generated or inputted by a user with driver tablet 310 or downloaded or entered using, e.g., mobile phone 333 or smart watch 313 (or any other mobile computing device) to driver tablet 110 which controls and provides information to coast-to-coast display 302. For one example, a user or driver is authenticated or identified before information and parameters can be generated or inputted for rotating polyhedron 317, which can be stored in one or more memories or databases stored in or coupled with driver tablet 310. For each user or driver, a personalized rotating polyhedron 317 can be provided and associated with respective personal information and parameters, e.g., heartbeats, heart rate, etc. For example, each user of driver can generate data points or can be automatically generated which can alter the shape of rotating polyhedron 317. The examples and embodiments for using rotating polyhedron 317 can be used any display interface environment such as a display interface for desktops, laptops, tablets, netbooks, mobile phones and devices in reducing clutter on a display.

Exemplary Data Processing and Computing System Architecture

FIG. 4 illustrates one example block diagram of data processing (or computing system) architecture 400 for exemplary environments 100, 150, 300 and 350 of FIGS. 1A-1B and 3A-3B. For one example, data processing system architecture 400 can represent a computing system for automobile 110 within dashboard 137, 337 in FIGS. 1B, 3A-3B. For other examples, architecture 400 can represent a computing system for driver tablet 310 or display computer 210 in FIGS. 1A-1B and 2.

Referring to FIG. 4, data processing system architecture 400 includes processor(s) 412, real time operation system 410, and inter-process communication 408 coupled with HMI middleware 402, virtual machine 404, virtual devices(s) environment 406, and secure/online services 414. Processor(s) 412 can include any type of ARM®, nVidia®, or Intel® microprocessor or central processing unit (CPU) configured to perform techniques and operations disclosed herein. For one example, processor(s) 412 can include a system-on-a-chip (SOC) such as nVidia Tegra® providing a graphical processing unit (GPU) architecture which can be used in automobiles providing graphical user interfaces and controls as shown in coast-to-coast display 302 in FIGS. 3A-3B. For one example, processor(s) 412 can also include nVidia Drive CX hardware and software solutions providing advanced graphics and computer vision navigation for coast-to-coast display 302 configured to implement techniques and operations disclosed herein. Processor(s) 412 can also include Intel In-Vehicle Infotainment (IVI)® or nVidia Drive CX® processing architecture and software providing information and entertainment features for automobiles configured using techniques and operations disclosed herein.

For one example, real-time operating system 410 can be a Unix® based operating system which can provide cloud connection via security/online services 414 and virtual device communication via virtual device(s) environment 406. Security/online services 414 can include a smart antenna and provide a secure gateway to external cloud services requiring user authentication using high speed wireless communication such as Long-Term Evolution (LTE) standard. Bluetooth® communication can also be provided by security/online services 414 for data processing system architecture 400. Virtual devices(s) environment 406 can include, e.g., Android® based environment of devices and virtual machines which can communicate with data processing system architecture 400.

Human machine interface (HMI) middleware 402 can include software to provide graphical user interfaces and controls or a driver or user of environment 100 and driver tablet 110. For one example, HMI middleware 402 can include the Unity® software or Softkinetics® software configured for providing user interfaces and controls to coast-to-coast displays 302 of FIGS. 3A-3B based on techniques and operations disclosed herein. HMI middleware 402 can also include software to process and analyze captured user images including 2D and 3D facial features, expressions, and temperature information received by user ID devices 107-A through 107-D, user capture devices 117-A through 117-C, user capture device 207, and user capture devices 307 and 377 as described in FIGS. 1A-3B. For one example, virtual machine 404 can operate as driver tablet 110 or other computing devices in automobile 110 or user interface applications for coast-to-coast display 302 using HMI middleware 402 such as Unity® or Softkinetics® software and inter-process communication 408. HMI middleware 402 can also include software to recognize user gestures from captured by gesture control device 327 using, e.g., Intel Realsense® software and hardware configured to recognize hand gestures to control interfaces on coast-to-coast display 302.

FIG. 5 illustrates one example block diagram of a computing system 500 for the data processing system architecture 400 of FIG. 4. For example, computer system 500 can represent the various components used for a computer such as automobile computer for automobile 110 within dashboard 137, 337 in FIGS. 1B, 3A-3B, or driver tablet 110, 310 or display computers 151-A, 151B. Although FIG. 5 illustrates various components of a data processing or computing system, the components are not intended to represent any particular architecture or manner of interconnecting the components, as such details are not germane to the disclosed examples or embodiments. Network computers and other data processing systems or other consumer electronic devices, which have fewer components or perhaps more components, may also be used with the disclosed examples and embodiments.

Referring to FIG. 5, computing system 500, which is a form of a data processing or computing system, includes a bus 503, which is coupled to processor(s) 502 coupled to cache 504, display controller 514 coupled to a display 515, network interface 517, non-volatile storage 506, memory controller coupled to memory 510, I/O controller 418 coupled to I/O devices 520, and database 512. Processor(s) 502 can include one or more central processing units (CPUs), graphical processing units (GPUs), a specialized processor or any combination thereof. Processor(s) 502 can retrieve instructions from any of the memories including non-volatile storage 506, memory 510, or database 512, and execute the instructions to perform operations described in the disclosed examples and embodiments.

Examples of I/O devices 520 include mice, keyboards, printers and other like devices controlled by I/O controller 518. Network interface 517 can include modems, wired and wireless transceivers and communicate using any type of networking protocol including wired or wireless WAN and LAN protocols including LTE and Bluetooth® standards. Memory 510 can be any type of memory including random access memory (RAM), dynamic random-access memory (DRAM), which requires power continually in order to refresh or maintain the data in the memory. Non-volatile storage 506 can be a mass storage device including a magnetic hard drive or a magnetic optical drive or an optical drive or a digital video disc (DVD) RAM or a flash memory or other types of memory systems, which maintain data (e.g. large amounts of data) even after power is removed from the system.

For one example, memory devices 510 or database 512 can bio-scan information for any number of users (e.g., drivers or passengers) for an automobile (e.g., automobile 110). Bio-scan information can include user images including 2D or 3D facial images and features and expressions. For other examples, memory devices 510 or database 512 can store user information and parameters related to, e.g., MyHealth, MyActivities, or MyEntertainment types of user information for applications on coast-to-coast display 302. Although memory devices 510 and database 512 are shown coupled to system bus 501, processor(s) 502 can be coupled to any number of external memory devices or databases locally or remotely by way of network interface 517, e.g., database 512 can be secured storage in a cloud environment. For one example, processor(s) 502 can implement techniques and operations described in FIGS. 1A-8 for recognizing users and expressions. Display 515 can represent coast-to-coast-displays 302 or a display for display computers 151-A, 151-B in FIGS. 1B and 3A-3B.

Examples and embodiments disclosed herein can be embodied in a data processing system architecture, data processing system or computing system, or a computer-readable medium or computer program product. Aspects, features, and details of the disclosed examples and embodiments can take the hardware or software or a combination of both, which can be referred to as a system or engine. The disclosed examples and embodiments can also be embodied in the form of a computer program product including one or more computer readable mediums having computer readable code which can be executed by one or more processors (e.g., processor(s) 402) to implement the techniques and operations disclosed in FIGS. 1A-8.

Exemplary User Identification Systems and Operations

Figure 6:
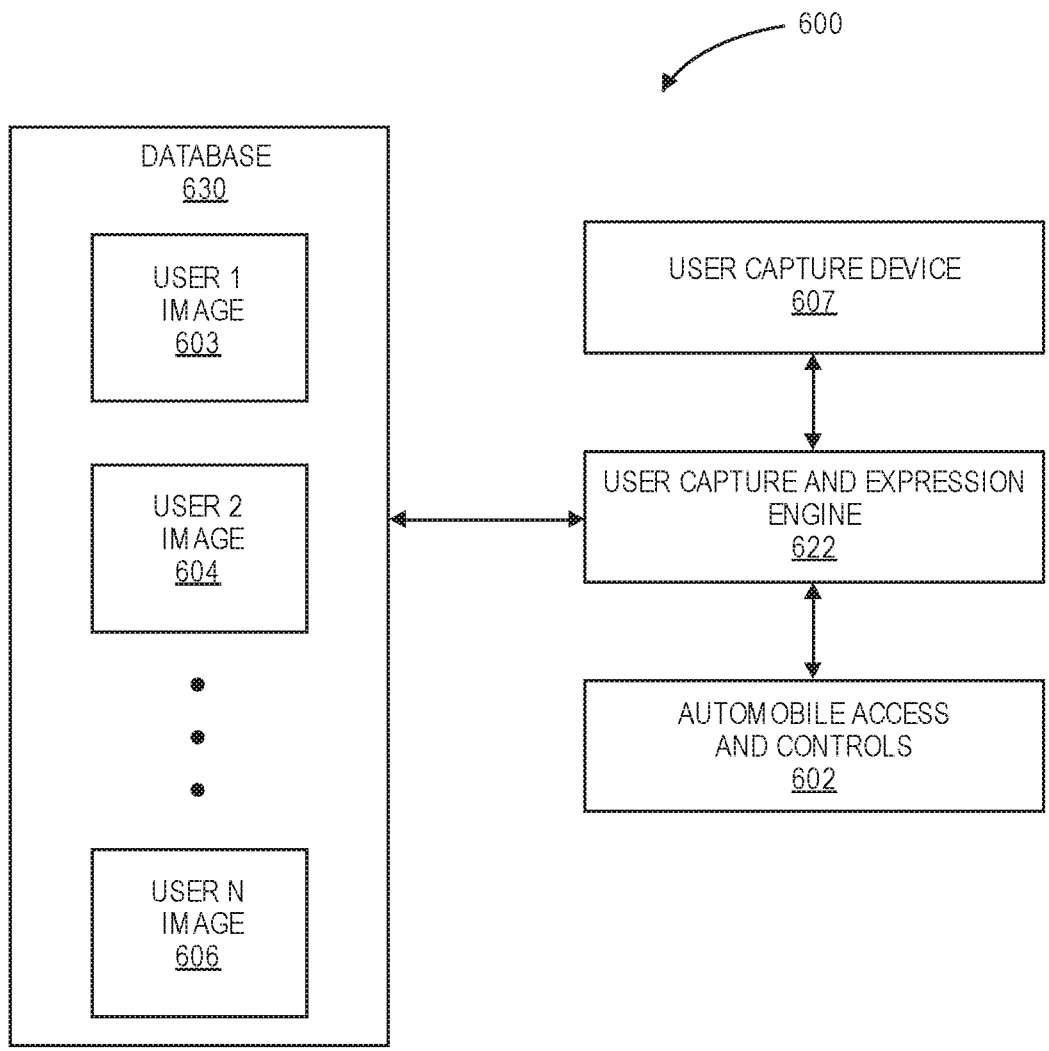
FIG. 6 illustrates a block diagram of a computing system to recognize users and capture user expressions for an automobile.

FIG. 6 illustrates a block diagram of a computing system 600 to authenticate drivers or users of an automobile. Computing system 600 includes a memory or database 630 coupled to user capture and expression engine 622. For one example, database 630 stores a plurality of bio-scan user information such as user images including user 1 facial features (603), user 2 facial features (604) up to user N facial features (606). Database 630 can store other types of bio-scan information including 2D and 3D images and facial expressions. Stored facial features can include the shape, size, and dimensions of facial features including, e.g., the nose, mouth, eyes, lips, cheeks, etc. for user 1 (603) to user N (606). For one example, information stored in database 630 can be stored during the registration of bio-scan information of one or more users for an automobile, e.g., automobile 110. Database 630 can be a secured storage located within an automobile or computer or in a secured cloud environment accessible by a user.

For one example, once a user (e.g., a driver or passenger) enters or is near is situated by an automobile (e.g., automobile 110), user capture device 607 can capture a user image, e.g., facial feature images. User capture and expression engine 622 can compare the captured user images including facial features with user images stored in database 630 including user 1 facial features (603) to user N facial features (606) to determine if a match exists that have been registered with the automobile. Engine 622 can use any facial recognition algorithms to recognize user images and facial features. If engine 622 detects a match, engine 622 can authenticate the user as a valid user and further determine if the user has driver credentials to allow to the automobile including access to controls for driving. For one example, engine 622 can detect a child entering a passenger door and allow the door to unlock, but deny the child access to driving controls of the automobile. User capture device 607 can also capture user temperature differential information using, e.g., an infrared camera, which can be processed by engine 622 to determine, e.g., wellness of a driver or passengers. For example, if temperature information indicates a driver has a higher differential reading than a passenger, engine 622 can determine the driver may not be well, e.g., having a fever, and reactions by automobile can be made. For one example, engine 622 can implement the techniques and operations as described in FIGS. 1A-8.

Figure 7A:
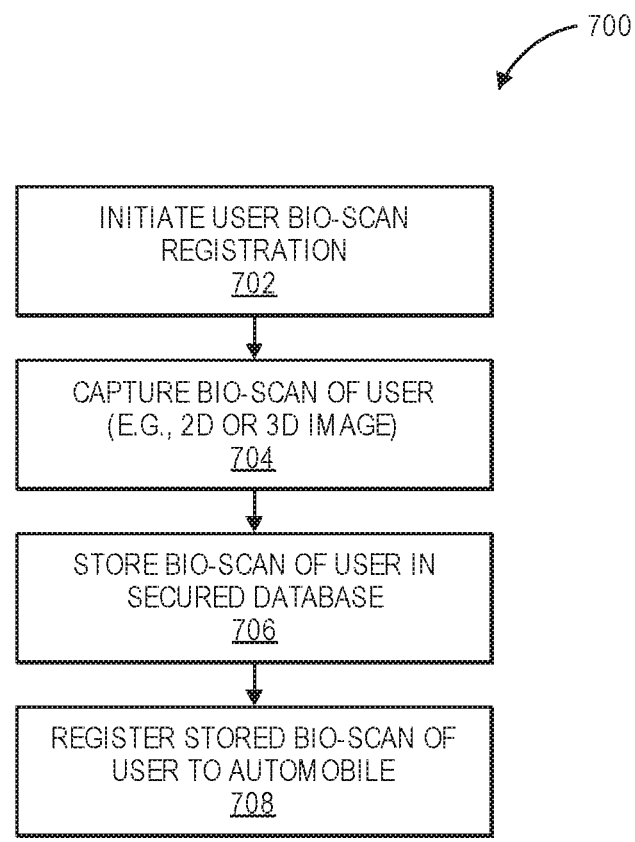
FIG. 7A illustrates a flow diagram of an example operation for registering a bio-scan of a user of an automobile.

FIG. 7A illustrates a flow diagram of an example operation 700 for registering a bio-scan of a user of an automobile.

At block 702, a user bio-scan registration is initiated. For one example, registering of bio-scan information of a user can be initiated by an application used to purchase or order an automobile (e.g., automobile 110). For one example, an application running on a mobile device that has been authenticated for the automobile with personal identification and password authentication, fingerprint authentication, or two-stage authentication can initiate the registration process. The user can also initiate bio-scan registration for other users such as, e.g., spouse, children, etc.

After initiation, at block 704, a bio-scan of a user is captured, e.g., a 2D or 3D facial image is captured. For one example, a mobile device or an automobile can have one or more cameras to capture user images such as 2D or 3D facial images. Images of more than one user can be captured during registration.

At block 706, the bio-scan of the user (or each user) is stored in a secured database. For one example, the captured bio-scan such as 2D or 3D user images including facial images are stored in a secured database locally in the automobile or remotely in a secured cloud environment.

At block 708, the stored bio-scan of the user is registered for the automobile. Each captured image can be registered for the automobile with restrictions as a driver or passenger or both. For example, a first user can be the owner of the automobile and can have driver access only and a second user can be a child of the first user and may not have driver access and only restricted to passenger status. Registration of users can place any number of controls and restraints on access and control of the automobile. For example, both a husband and wife may be registered to drive the automobile (e.g., automobile 110), but all the children do not have authorization to drive and only have access to passenger display computers 115-A and 115-B.

Figure 7B:
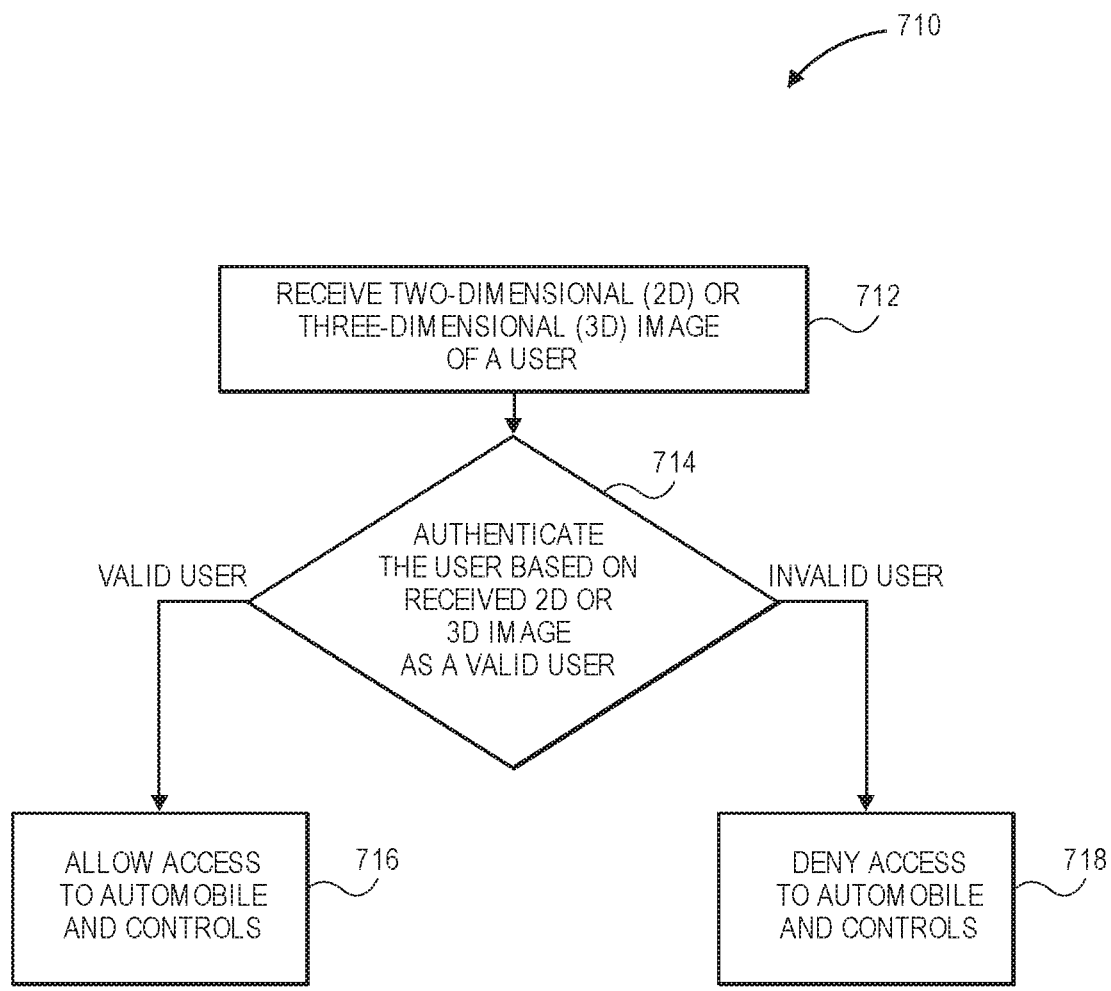
FIGS. 7B-7C illustrates flow diagrams of example operations authenticating a user of an automobile.

FIG. 7B illustrates a flow diagram of one example operation 710 for authenticating a user of an automobile. At block 712, two-dimensional (2D) or three-dimensional (3D) facial features of a user are received (e.g., 2D or 3D facial features 211 of user head 201).

At block 714, the user is authenticated based on the received 2D or 3D facial features as a valid user. For example, referring to FIG. 6, engine 622 can receive 2D or 3D facial features from a user capture device 607 and compare them with stored user images including facial features in database 630 to authenticate the user by determining if user images including facial features match. If a match exists, the user can be determined to be a valid user. If no match exits, the use can be determined to be an invalid user.

At block 716, if the user is authenticated as a valid user, the user is allowed access to the automobile (e.g., automobile 110) and controls (e.g., control interfaces on coast-to-coast display 302). At block 718, if the user is not authenticated as a valid user, the user is denied access to the automobile and its controls.

Figure 7C:
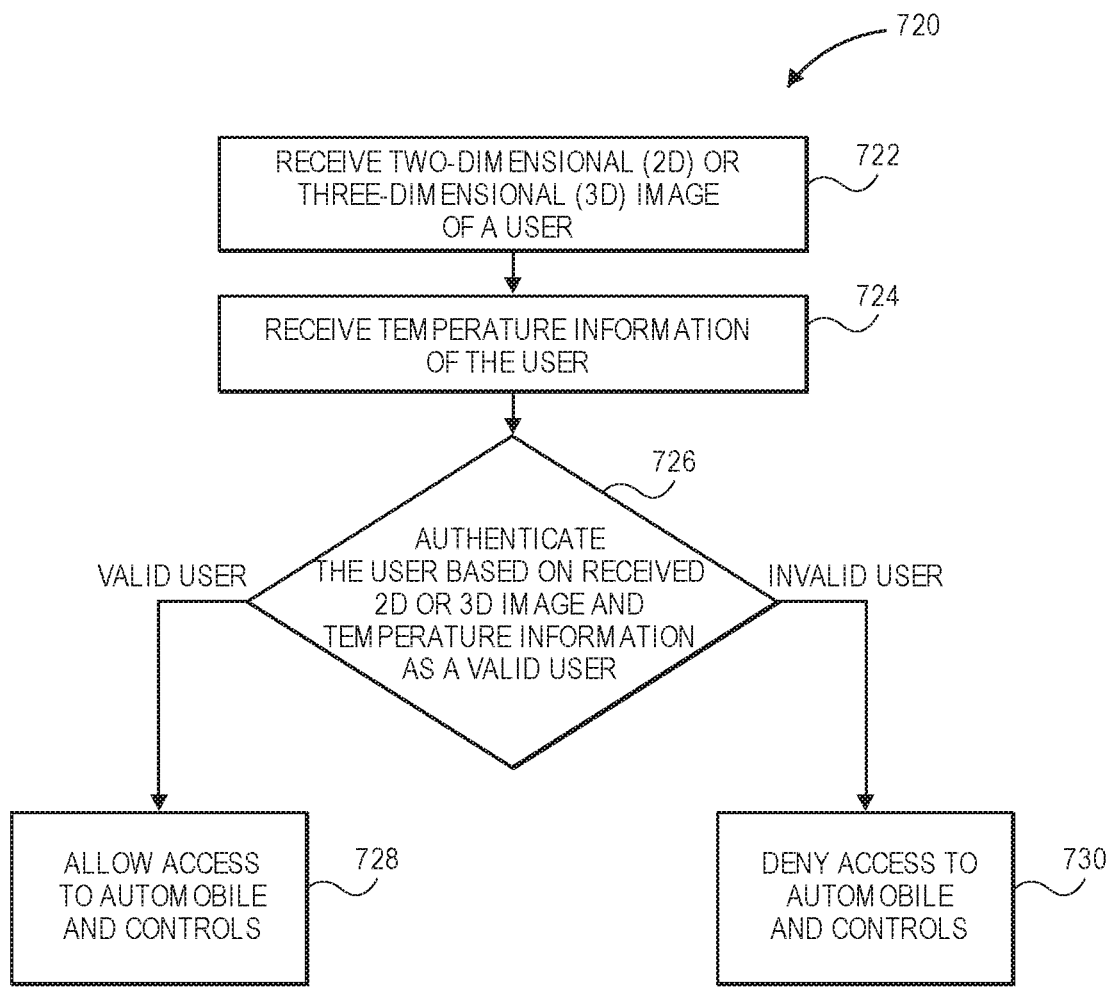

FIG. 7C illustrates a flow diagram of one example operation 720 for authenticating a user of an automobile.

At block 722, two-dimensional (2D) or three-dimensional (3D) facial features of a user are received. At block 724, temperature information of the user is received. For example, referring to FIG. 2B, user capture device 207 can include an infrared camera to capture temperature differential information of user head 201.

At block 726, the user is authenticated based on the received 2D or 3D facial features and temperature information as a valid user. For example, referring to FIG. 6, engine 622 can receive 2D or 3D facial features and temperature information from a user capture device 607. Engine 622 can compare the received 2D or 3D images with stored user images including facial features in database 630 to authenticate the user by determining if user images including facial features match. Engine 622 can also analyze the temperature information to determine if the user image is not illustrating an inanimate object in detecting a real user and preventing impersonation. If a match exists with user images and the temperature information indicates a real user, the user can be determined to be a valid user. If no match exits and the temperature information does not indicate a real user, the user can be determined to be an invalid user.

At block 728, if the user is authenticated as a valid user, the user is allowed access to the automobile (e.g., automobile 110) and controls (e.g., control interfaces on coast-to-coast display 302). At block 730, if the user is not authenticated as a valid user, the user is denied access to the automobile and controls.

Figure 8:
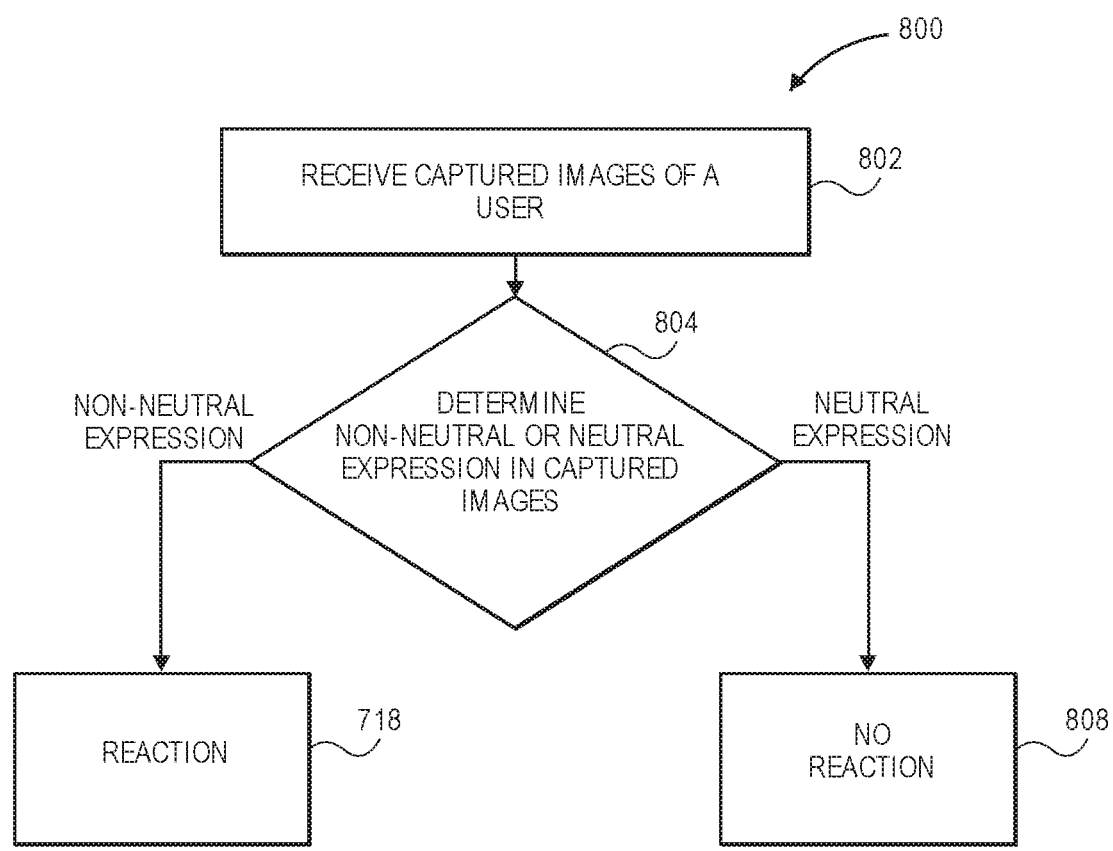
FIG. 8 illustrates a flow diagram of an example operation processing neutral and non-neutral facial expressions of a user of an automobile.

FIG. 8 illustrates a flow diagram of an example operation 800 processing neutral and non-neutral facial expressions of a user of an automobile. At block 802, captured images of a user are received. For example, user capture devices 117-A through 117-C, user capture device 207, and user capture devices 307, 377 in FIGS. 1B, 2A-2B, and 3A-3B can capture images of users (e.g., a driver and passengers).

At block 804, a determination is made of non-neutral or neutral expressions in the captured images of the user. Examples of non-neutral expressions can include a selfie, smile, frown, sleeping, dozing, eyes opening and shutting, anger, happiness, fatigue, anger, stress, or shaking. Neutral expressions are expressions that are not recognized to provide a reaction.

At block 806, if a non-neutral expression is determined in the captured image, the automobile may provide a reaction. For example, if a non-neutral expression is captured such as, e.g., a user's eyes shut for a period of time, engine 622 can provide a reaction by providing an audio alert to wake up the user. Any type of reaction can be provided such as messages on a display, blinking lights on a display, changing settings and preferences, vibrating chair and etc.

At block 808, if a neutral expression is determined in the captured image, the automobile will provide no reaction. Neutral expressions can be normal facial expressions without any deterministic changes or features.

In the foregoing specification, the invention has been described with reference to specific exemplary embodiments thereof. It will, however, be evident that various modifications and changes may be made thereto without departing from the broader spirit and scope of disclosed examples and embodiments. The specification and drawings are, accordingly, to be regarded in an illustrative rather than a restrictive sense.

What is claimed is:

1. A data processing system for an automobile comprising:
    a secure database to store at least a registered image of a user of the automobile, wherein the user provides user information to an application on a mobile device or computing device associated with the automobile that authenticates the user information and captures the image of the user that is registered and stored in the secure database once the user information is authenticated, and wherein the user information includes indication identifying the valid user as authorized driver or restricted user;
    a camera to capture an image of an approaching person; and
    a computer coupled to the secure database and the camera, the computer to allow the user access to the automobile if the approaching person is authenticated as a valid user by determining if the registered image of the user stored in the secure database matches the captured image of the approaching person from the camera and disallows access if the approaching person is not authenticated as a valid user, and wherein the computer allows access to driving controls when the approaching person is identified as authorized driver, and prevents access to driving controls when the approaching person is identified as restricted user.

2. The data processing system of claim 1, wherein the registered image of the user stored in the secure database includes two-dimensional (2D) or three-dimensional (3D) images.

3. The data processing system of claim 1, wherein the camera is to capture an expression of the user including a selfie, smile, frown, sleeping, dozing, eyes opening and shutting, anger, happiness, fatigue, stress, or shaking.

4. The data processing system of claim 3, wherein the computer provides a reaction based on the capture expression.

5. The data processing system of claim 1, further comprising an interior three dimensional camera, and wherein the computer allows access to driving controls based on images from the interior three dimensional camera.

6. The data processing system of claim 5, wherein the plurality of cameras includes a stereo camera, a RGB (red, green, blue) camera, or an infrared camera.

7. The data processing system of claim 6, one of the cameras include an infrared camera to capture temperature differential information to further recognize a valid user.

8. The data processing system of claim 1, further comprising a display and wherein when the computer allows the user access to the automobile and controls of the automobile the computer generates on the display a rotatable object personalized to the user.

9. The data processing system of claim 8, wherein the rotatable object comprises a polyhedron.

10. The data processing system of claim 8, wherein the computer configures the automobile with settings and preferences for the user if the user and make the settings and preferences accessible by the user through the rotatable object.

11. The data processing system of claim 1, wherein the camera is located inside or outside of the automobile.

12. The data processing system of claim 10, wherein the object is a polyhedron and the settings and preferences are accessible through different polygonal sides.

13. A method comprising:
    providing user information to an application on a mobile device or computing device associated with an automobile;
    authenticating the user information and capturing an image of a user to be registered for the user of the automobile by the application once the user information is authenticated;
    storing the registered image of the user in a secure database and storing indication identifying the user as authorized driver or restricted user;
    capturing an image of an approaching person; and
    authenticating the approaching person as a valid user for access to the automobile if the captured image of the approaching person matches the registered image of the user stored in the secure database and disallows access if the approaching person is not authenticated as a valid user, and allowing access to driving controls when the approaching person is identified as authorized driver, and preventing access to driving controls when the approaching person is identified as restricted user.

14. The method of claim 13, further comprising:
    when the approaching person is authenticated as a valid user, displaying on a monitor a graphical object personalized to the user.

15. The method of claim 14, wherein the graphical object comprises a rotating polyhedron.

16. The method of claim 14, further comprising:
    configuring the automobile with settings and preferences for the approaching person if the approaching person is authenticated as a valid user and making the settings and preferences accessible through the graphical object.

17. The method of claim 13, further comprising:
    storing the image of the user including facial features in the secure database.

18. The method of claim 13, wherein the received captured image of the user includes two-dimensional (2D) or three-dimensional (3D) images.

19. The method of claim 13, further comprising:
    receiving temperature information of the user to further authenticate the user as a valid user.

20. The method of claim 13, further comprising:
    receiving a captured expression of the user including a selfie, smile, frown, sleeping, dozing, eyes opening and shutting, anger, happiness, fatigue, stress, or shaking; and providing a reaction based on the captured expression.

21. The method of claim 13, further comprising:
    operating an interior camera to capture three-dimensional image of the approaching person and allowing access to driving controls based on the three-dimensional image.

22. A non-transitory computer-readable medium, including instructions which if executed by a computer, cause the computer to:
    provide user information to an application on a mobile device or computing device associated with an automobile;

authenticate the user information and capturing an image of a user to be registered for the user of an automobile by the application once the user information is authenticated;

store the registered image of the user in a secure database and store indication identifying the user as authorized driver or restricted user;

capture an image of an approaching person; and authenticate the approaching person as a valid user for access to the automobile if the captured image of the approaching person matches the registered image stored in the secure database and disallows access if the approaching person is not authenticated as a valid user, and allows access to driving controls when the approaching person is identified as authorized driver, and prevents access to driving controls when the approaching person is identified as restricted user.

23. The non-transitory computer-readable medium of claim 22, including instructions which if executed by the computer, cause the computer to display a graphical object tailored to the approaching person if the approaching person is authenticated as authorized driver.

24. The non-transitory computer-readable medium of claim 23, including instructions which if executed by the computer, cause the computer to display the graphical object in the form of polyhedron.

25. The non-transitory computer-readable medium of claim 22, including instructions which if executed by the computer, cause the computer to configure the automobile with settings and preferences for the approaching person if the approaching person is authenticated as a valid user and make the settings and preferences accessible by the approaching person through a graphical object.

26. The non-transitory computer-readable medium of claim 22, including instructions which if executed by the computer, cause the computer to store the image of the user including facial features in the secure database.

27. The non-transitory computer-readable medium of claim 22, including instructions which if executed by the computer, cause the computer to receive temperature information of the user to further authenticate the user as a valid user.

28. The non-transitory computer-readable medium of claim 22, including instructions which if executed by the computer, cause the computer to receive a captured expression of the user including a selfie, smile, frown, sleeping, dozing, eyes opening and shutting, anger, happiness, fatigue, stress, or shaking.

29. The non-transitory computer-readable medium of claim 22, including instructions which if executed by the computer, cause the computer to provide a response based on the captured expression.

30. The non-transitory computer-readable medium of claim 22, including instructions which if executed by the computer, cause the computer to receive captured three-dimensional (3D) image of the user and allows access to driving controls based on the 3D image of the user.

* * * * *